Nov. 14, 1933. J. R. LONG 1,934,933
REVOLUBLE STALL FOR AUTOMOBILES
Filed July 5, 1932 3 Sheets-Sheet 1

Inventor:
John H. Long,
by: Bradbury
Attorney

Nov. 14, 1933.        J. R. LONG        1,934,933
REVOLUBLE STALL FOR AUTOMOBILES
Filed July 5, 1932        3 Sheets-Sheet 2

Inventor:
John R. Long,
by: J. Bradbury
Attorney

Nov. 14, 1933.   J. R. LONG   1,934,933
REVOLUBLE STALL FOR AUTOMOBILES
Filed July 5, 1932   3 Sheets-Sheet 3
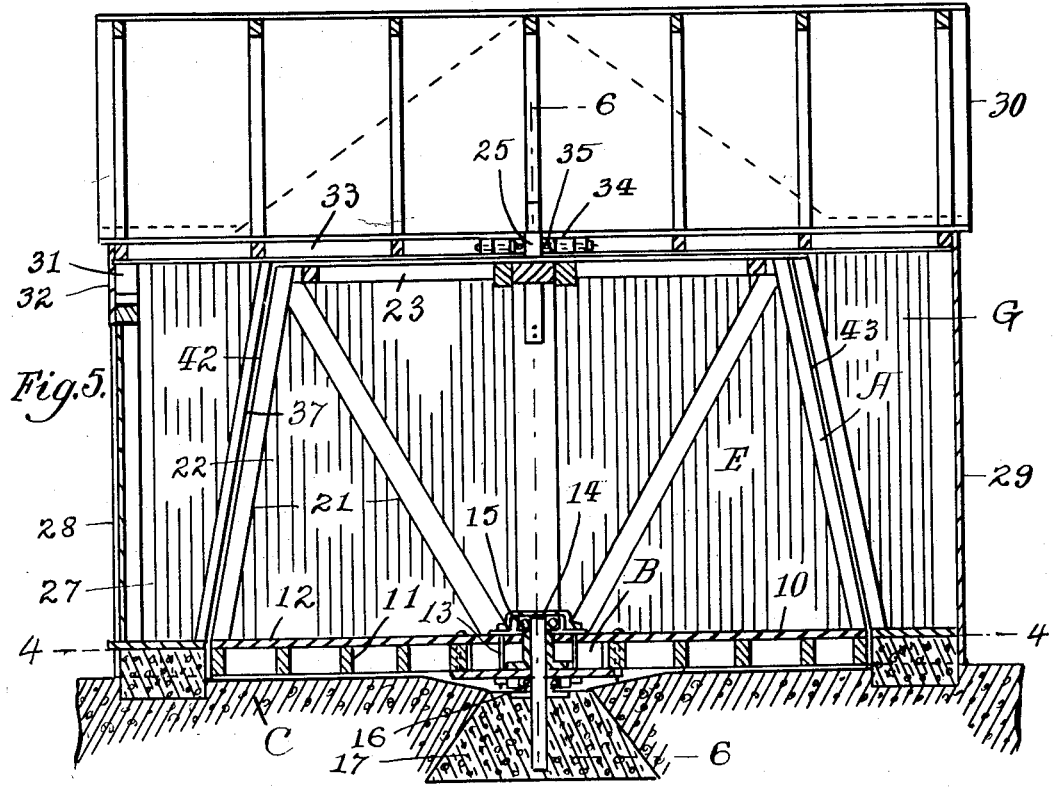
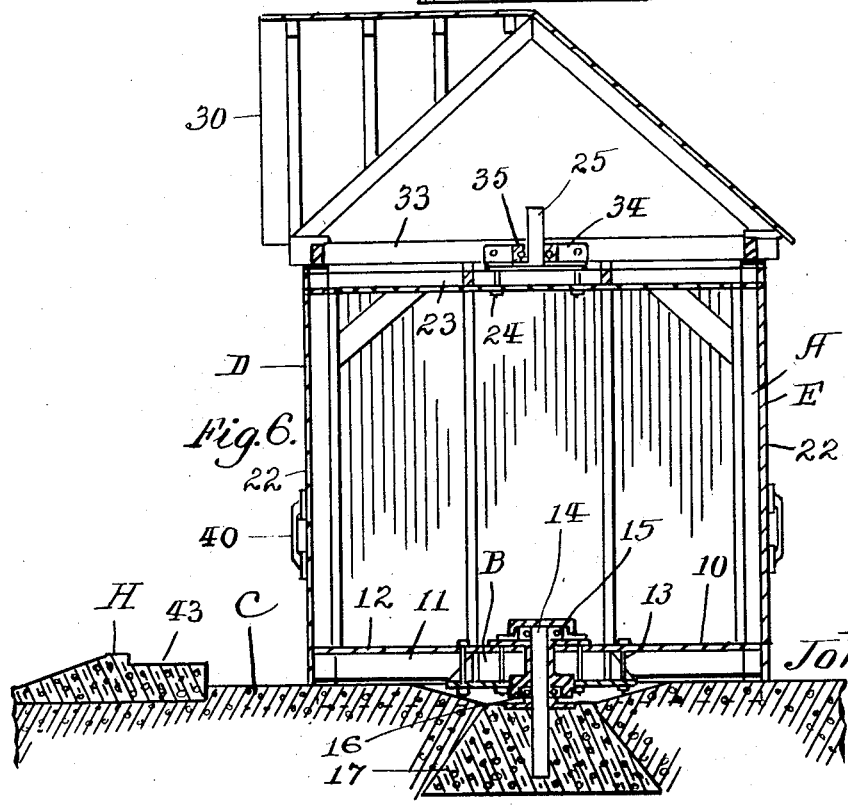
Inventor:
John R. Long,
by
Attorney.

Patented Nov. 14, 1933

1,934,933

UNITED STATES PATENT OFFICE 1,934,933

REVOLUBLE STALL FOR AUTOMOBILES

John R. Long, Los Angeles, Calif.

Application July 5, 1932. Serial No. 620,900

10 Claims. (Cl. 20—1.13)

The primary object of this invention is to provide a stall into which an automobile can be driven and by which said automobile can be reversed and driven forwardly out and so that by partial revolution the entrance through which the automobile is driven can be closed or opened automatically.

A further object is to provide a stall for automobiles which is designed to permit of easy manual operation to reverse the car and to open or close the housing containing the revoluble stall in which the car is held.

A further object is to provide a stall either with or without a stall containing housing and which can be employed alone to house the car and which is revoluble in a horizontal plane to permit reversing the car so that it can be driven head first into the stall and after turning the stall, driven head first out in a different direction. A still further object is to provide the enclosing stall for the car, with an outside housing in which the stall is contained in such manner that its sides will act as doors and close the entrance into the housing when the stall is turned about its axis.

A further object is to provide means operated by the driver by which the stall containing the car can be turned and the housing or exit opened or closed automatically while the driver remains in the car.

A distinct advantage attained by my improvement is that when the vehicle is driven into the garage and the stall turned one fourth of its circumference, the door closes automatically also when the door is opened from the other side the vehicle completes the revolution one half and is ready to be driven out.

Still further objects are simplicity of construction, low cost of production, ease of operation and greater effectiveness in use.

The invention is designed to eliminate the chances of backing out of a driveway and striking children or objects of any kind, although other novel features to be pointed out in the following specification, accomplish all of the above as well as other advantageous results.

Figure 1:
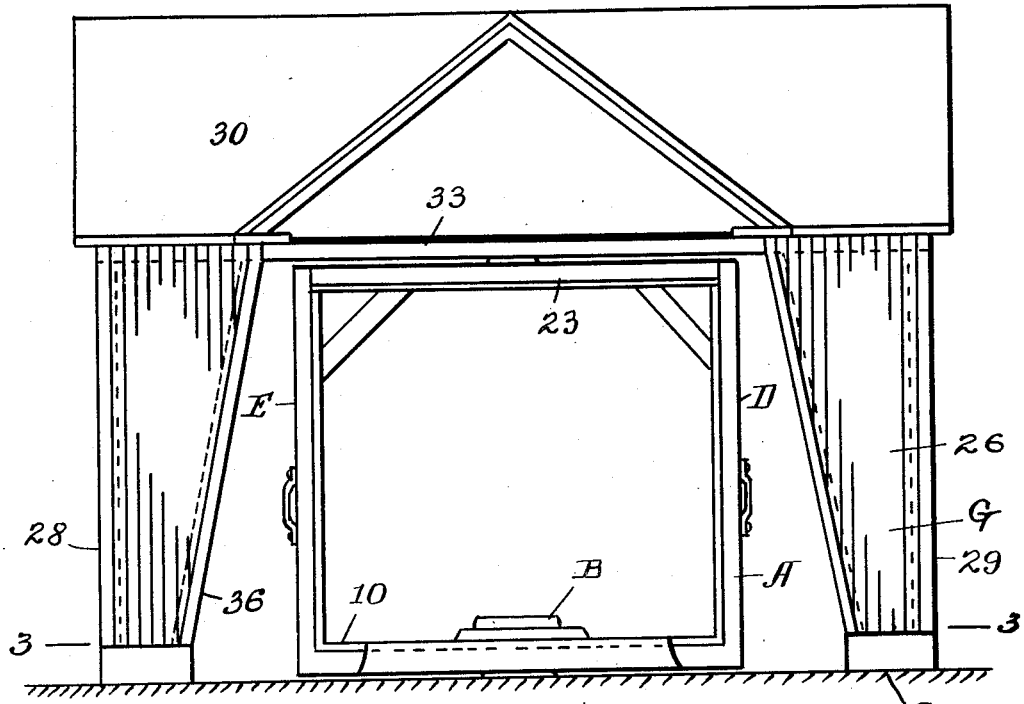
Figure 2:
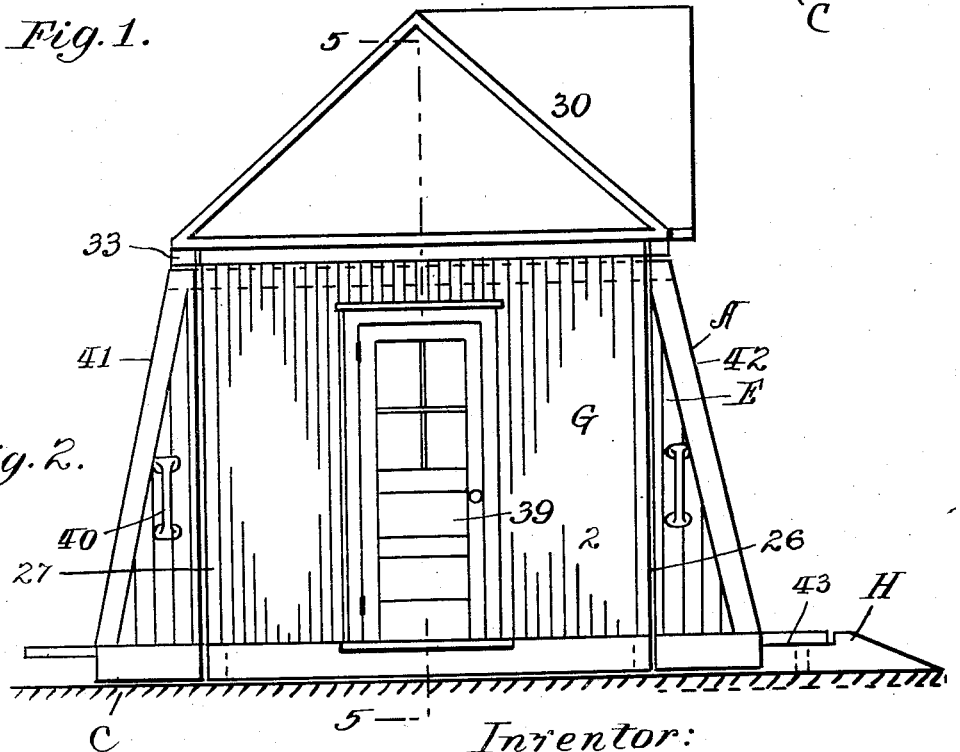
Figure 3:
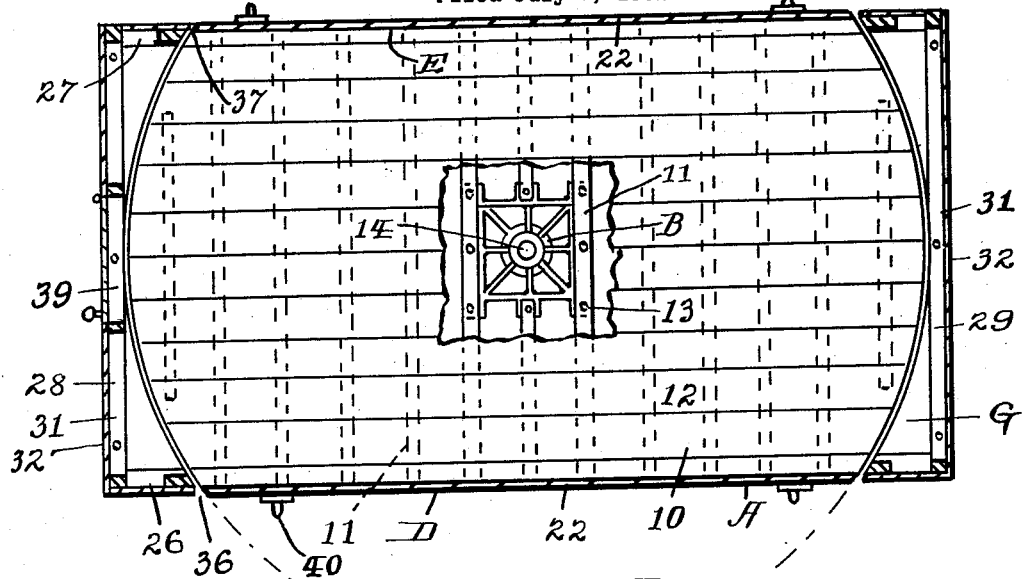
Figure 4:
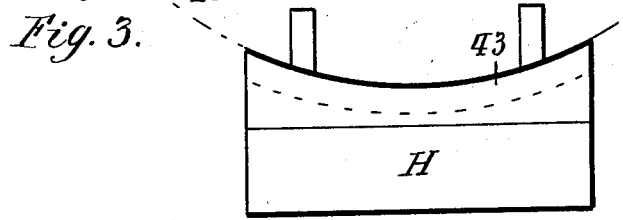
Figure 4:
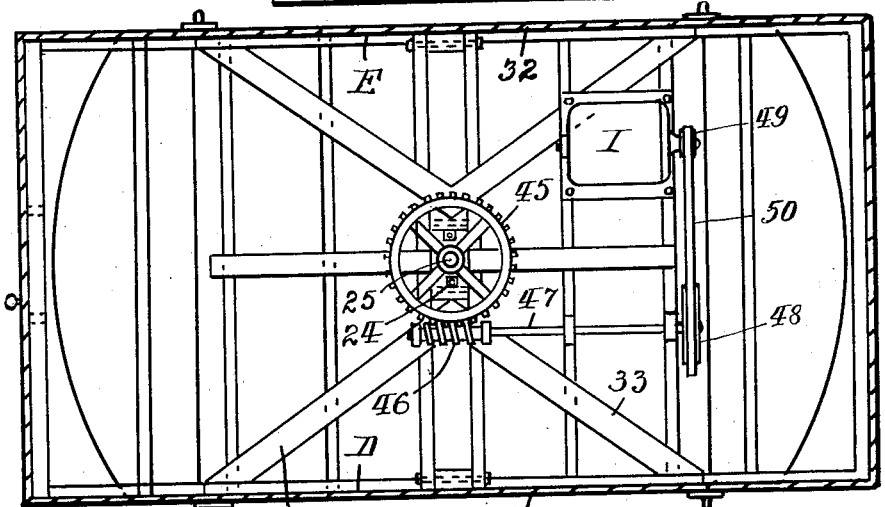

In the accompanying drawings, forming part of this specification, Fig. 1 is a front elevation of my invention showing the revoluble stall in open position in its housing; Fig. 2 is a side elevation of the structure shown in Fig. 1; Fig. 3 is a horizontal section partly broken away, on the line 3—3 of Fig. 1, when the stall is in closed instead of open position; Fig. 4 is a section taken on line 4—4 of Fig. 5 when the housing is equipped with a motor for revolving the stall; Fig. 5 is a central vertical section such as when taken on line 5—5 of Fig. 2 and when the stall is in closed position, and Fig. 6 is a vertical section taken on the line 6—6 of Fig. 5.

In the drawings, A indicates a stall suitable for holding an automobile having an elongated vehicle receiving platform 10, produced by a suitable frame 11, covered by suitable flooring 12 and having a centrally disposed journal bearing B, formed by a suitable metal skeleton frame bolted at 13 or otherwise secured to the platform frame 11 and through which a vertical shaft 14 is freely journaled by antifriction bearing elements 15 and 16, the latter being stepped in a concrete footing 17 held in base C. Said base C may be natural ground or any suitable support made of cement or other suitable material upon which the entire stall structure is erected and journaled to turn in a horizontal plane. The shaft 14 projects downwardly into the footing and aided by the antifriction bearings permits the platform to turn freely. The opposite ends 18 of the platform are circularly shaped concentric with the vertical axis produced by journal bearing B and the width of the platform is narrow as compared with its length, the proportions being suitable to receive and hold a vehicle lengthwise fully within the stall. The opposite vertical sides D and E of the stall are each formed by suitable braced and cross braced frames 21 (see Fig. 5) covered by suitable sheathing 22 to protect the vehicle within the stall. Also the top F of the stall is formed by a braced and cross braced horizontal frame 23. Secured to the central portion of top frame 23, by bolts 24 or other suitable means is a gudgeon having an upwardly projecting shaft 25 co-axial with the platform shaft 14 below for the purpose of guiding the upper end of the stall when desired.

A suitable housing G is employed when desired enveloping the stall A upon the base C. This housing has front and rear vertical walls 26 and 27, a pair of opposite side vertical walls 28 and 29 and a roof structure 30. These parts are shown constructed with suitable frame work 31 and sheathing 32 to close the housing and protect the stall within. The roof structure has a super-frame 33 over the top of the stall in which a journal frame supporting element 34 is held and by which an antifriction bearing 35 is seated over shaft 25 so as to revolubly hold the upper portion of the stall in vertical alignment with the lower journal bearing and hold the upper portion of the stall from tilting. The housing including its sides and roof may be of any suitable design desired but preferably it may have two main entrances such as 36 and 37 through which the open ends of the stall are adapted to project in the open position of the stall as shown in Figs. 1 and 2 so that a vehicle can be driven into or out of the stall.

In front of the entranceway 36 of the housing is a suitable ramp H, with which one or the other of the open ends of the stall is adapted to register when the stall assumes open position so as to facilitate driving a vehicle into or out of the stall. After a vehicle has been driven into the stall, the latter can be easily turned a half revolution to reverse the vehicle so that the latter can be driven head on in forward or reverse directions.

The design and proportions of the housing are such that when the stall is turned from completely open position a quarter revolution, the opposite sides of the stall will act as doors and completely close the entrance ways 36 and 37 automatically. In this closed position the ends of the housing close the ends of the stall. Thus the stall is adapted to be completely closed and the vehicle therein fully protected by the combined sides and roof of the stall and housing.

It will be noted that as shown the length of the stall is substantially equal to the length of the housing so that when the stall is swung into closed position the two opposite vertical side walls of the stall lie in substantially the same plane as the front and rear of the housing and close the stall entrance ways. The vertical shaft 14 is held stationary and solid with the concrete or base C. The upper axis only is intended to prevent vibrating and tilting movement and does not carry any weight. In addition it provides means for connecting the worm gear 45 to assist in turning the stall by mechanical means. When the superstructure is not used or wanted then and in that case the upper axis will not be necessary, and in this arrangement the mechanical means of opening the stall and closing it can be placed underneath the floor or stall.

A service door 39 is shown in one end of the housing by the use of which the stall can be entered when closed. Handles 40 on the sides of the stall facilitate turning the stall on its bearings by hand when a motor drive is not employed. If desired the ends and sides of the stall and stall entrance ways may be designed with slanting cooperating edges 41 and 42 (see Fig. 5) to produce a more ornamental effect and also to economize dimensions, reduce weight on the upper portion of the stall and brace the structure. When desired the ramp H may have an approach rest 43 for the platform of the stall when the latter is in open position to assist in supporting the weight of the vehicle. This approach rest also relieves the weight of the vehicle until the vehicle reaches its balance or nearly its balance in the center of the stall after which the ends of the platform will swing clear of the rest by slight upward movement. When desired the floor of the stall may be sunk flush with the level of the ground in which event a ramp such as H is unnecessary. Also the housing may be changed in outline so long as the sides of the stall will close the front entrance way of the housing when the stall is moved into closed position.

If it is desired to turn the stall by mechanical means any suitable prime mover may be employed such as the electric motor I, (see Fig. 4) shown mounted on the super frame 33 of the housing, said motor being geared to the upper shaft 25 by a worm wheel 45, worm pinion 46, drive shaft 47, pulleys 48 and 49, and belt 50, said drive shaft being suitably journaled upon the super frame 33 of the housing. The motor may be controlled by a switch, conveniently placed, in the usual manner (not shown) so that the operator of a vehicle while in the stall can cause the turning of the stall automatically without leaving the vehicle. The switch can be placed inside or outside of the stall or garage so that the operator can control the operation of the stall from a point inside or outside of the structure. When desired the stall can be constructed and used without the use of an independent stationary housing and a saving effected in expense and material used.

In accordance with the patent statutes, I have described the principles of operation of my invention, together with the construction which I now consider to represent the best embodiment thereof but I desire to have it understood that the apparatus shown is only illustrative and that the invention can be carried out by other means and applied to uses other than those above set forth within the scope of the following claims.

Having described my invention what I claim as new and desire to secure by Letters Patent is:

1. A device of the class set forth, comprising, in combination, a suitable base, a stall into which a vehicle is adapted to be driven having a platform, sides and an overhead structure with which said sides are united, a stationary superstructure supported by said base and a pair of revoluble bearing elements coaxially arranged centrally of said stall between said base and platform and between said overhead and superstructures.

2. A device of the class set forth, comprising, in combination, a suitable base, a stall into which a vehicle is adapted to be driven having a platform and sides and ceiling walls serving to protect the vehicle within the stall and said platform being centrally and revolubly supported on said base about a vertical axis whereby a vehicle in said stall can be turned and moved forwardly out of said stall.

3. A device of the class set forth, comprising, in combination, a suitable base, a stall into which a vehicle is adapted to be driven having a platform, sides and an over head structure with which said sides are united, a stationary superstructure supported from said base and a pair of revoluble bearing elements coaxially arranged centrally of said stall between said base and platform and between said over head structure of the stall and said superstructure, and a stationary ramp on said base adjacent to said platform and with which the open ends of said platform are adapted to successively register as said stall is revolved about its axis.

4. A device of the class set forth, comprising, in combination, a suitable base, a stall, into which a vehicle may be driven, having a platform, sides and an overhead structure with which said sides are united, a revoluble bearing element between said base and platform about which said stall is adapted to revolve on a vertical axis and turn a vehicle thereon, a housing enveloping said stall having a doorway for vehicles with which an open end of said stall is adapted to register in one position when the stall is turned on its bearing element and with which a side of said stall is adapted to register to close said doorway in another position of said stall when turned on its bearing element.

5. A device of the class set forth, comprising, in combination, a suitable base, a stall into which a vehicle is adapted to be driven, having a platform, a pair of opposite sides and a pair of opposite open ends, a revoluble bearing element between said base and platform about which said stall is adapted to revolve on a vertical axis to turn a vehicle therein, a housing enveloping said stall having a pair of oppositely disposed vehicle entrance ways with which the open ends of said stall are adapted to register in one position when the stall is revolved on its bearing element and with which the sides of said stall are adapted to register to close said doorways in another position of said stall when turned on its bearing element.

6. A device of the class set forth, comprising, in combination, a suitable base, a stall into which a vehicle is adapted to be driven having a vehicle receiving platform, a pair of opposite sides, an overhead frame and a pair of open ends, a housing enveloping said stall having a pair of oppositely disposed vehicle doorways and a superstructure over said overhead frame of said stall, and a pair of bearing elements arranged on a vertical axis through the center of said stall, one bearing element being disposed between said overhead frame and superstructure, and the other between said base and platform, and said parts being so arranged that said open ends of said stall will register with said doorways in one position of said stall and that said sides will close said doorways when said stall is turned into another position.

7. A device of the class set forth, comprising, in combination, a suitable base, a stall into which a vehicle is adapted to be driven having a pair of opposite sides and a pair of open ends, a housing enveloping said stall having a vehicle doorway and a bearing element arranged on a vertical axis through the center of said stall between said base and platform, said parts being disposed so that a side of said stall will close said doorway in one rotatable position of the stall and so that the open ends of said stall will successively register with said doorway when the stall is revolved.

8. A device of the class set forth, comprising, in combination, a housing having an entrance way in its side, a stall having a platform upon which a vehicle is adapted to be driven pivoted above and below to turn the vehicle by a one half revolution and having a side which is adapted to automatically close said entrance way when the platform is turned from vehicle receiving position substantially a one quarter revolution and to automatically open said entrance way when the platform is revolved away from closed registering position.

9. A device of the class set forth, comprising, in combination, a garage having an open side forming an entrance way for a vehicle and a revoluble stall swiveled in said garage having a side adapted to register with and close said opening when said stall is turned into one position and to move out of registration and open said entrance way as the stall is moved out of said registering position.

10. A device of the class set forth, comprising, in combination, a garage having an opening for vehicles in its side, a vehicle base swiveled to turn in said garage, and means functioning with the turning movement of said base for automatically opening and closing said opening.

JOHN R. LONG.